United States Patent [19]

Sterner et al.

[11] Patent Number: 4,473,214

[45] Date of Patent: Sep. 25, 1984

[54] LUFFING JIB FOR CONSTRUCTION CRANE

[75] Inventors: Russell L. Sterner, Greencastle, Pa.; Reginald P. Whittingham, Orange, Calif.

[73] Assignee: Kidde, Inc., Saddle Brook, N.J.

[21] Appl. No.: 418,622

[22] Filed: Sep. 16, 1982

Related U.S. Application Data

[62] Division of Ser. No. 219,912, Dec. 24, 1980, Pat. No. 4,383,616.

[51] Int. Cl.[3] ........................ F16M 11/08; F16M 11/12

[52] U.S. Cl. .................................... 254/415; 248/654; 248/662

[58] Field of Search ............... 254/393, 401, 402, 403, 254/404, 405, 406, 407, 408, 409, 410, 411, 412, 413, 414, 415, 416, 417; 248/654, 662; 212/175, 182

[56] References Cited

U.S. PATENT DOCUMENTS

| | | | |
|---|---|---|---|
| 3,955,798 | 5/1976 | Meyer | 254/393 |
| 4,383,616 | 5/1983 | Sterner et al. | 212/182 |

*Primary Examiner*—Stuart S. Levy
*Assistant Examiner*—Joseph J. Hail, III
*Attorney, Agent, or Firm*—Brady, O'Boyle & Gates

[57] ABSTRACT

A massive crane luffing jib is held and loaded under compression atop the main crane boom such as a hydraulically extensible and retractable telescopic boom whose sections may be locked for safety. The luffing jib is pivoted to an adapter atop the boom to enable swinging the jib to a stowed position close to and along the front side of the boom. First, second and third masts are pivotally attached to the jib base section. The second and third masts are connected by foldable tension links. An upper foldable ladder in the pendant line between the point of the jib and bridle assembly forms a hard connection between the first and second masts. A lower foldable ladder including a gooseneck forms a hard connection between the second and third masts following automatic coupling of the gooseneck with the third mast after the tension link becomes fully extended. A safety backstop or stay connected between the luffing jib and the adapter on which it is mounted prevents rearward tipping over of the jib and activates a safety control switch operating mechanism. The several masts, tension links, folding ladders and backstays fold compactly onto the base section of the luffing jib for easy storage and transport without separation and misarrangement of parts. A bridle storage and lifting arrangement is also disclosed.

9 Claims, 13 Drawing Figures

LUFFING JIB FOR CONSTRUCTION CRANE

BACKGROUND OF THE INVENTION

This is a division of application Ser. No. 6,219,912 filed Dec. 24, 1980, now U.S. Pat. No. 4,383,616.

Diverse forms of construction cranes are known including mobile tower and truss cranes, some of which are equipped with luffing jibs. Such cranes have a notable deficiency in that the length of the tower or radius of the truss boom is fixed. This reduces the operating versatility of these cranes. So-called hammerhead cranes are widely used in large building construction and possess the advantage of being able to service the entire horizontal area spanned by the building by means of the load carriage which traverses the horizontal counterweighted crane boom. The disadvantage of the hammerhead crane is that it is erected with the building and is dismantled only after completion of the building construction. It therefore lacks mobility.

A third commonly used crane is the mobile hydraulically operated telescoping multi-section boom crane with full luffing and sluing capability. This latter type of the crane, while exceedingly versatile, lacks some of the capabilities of larger tower and truss types, as well as hammerhead cranes, for placing or retrieving loads at or from central locations on tall structures where the loads are quite distant from the structure side walls. The luffing jib structure forming the main subject matter of this invention is employed with the variable radius mobile telescoping boom crane, discussed immediately above.

The main objective of the invention is to fulfill a particular need in the art for a highly mobile variable radius crane which will be capable of doing much of the work which presently can only be done by larger truss and tower cranes or the completely immobile hammerhead types. More particularly, the present invention provides a large luffing jib for mounting atop the telescoping boom of a mobile hydraulically operated crane to greatly expand the utility and the versatility of such a crane.

Another object is to provide a luffing jib assembly which is easy to erect and which folds or collapses into a very compact form for ready transport without separating the component parts thereof. Since the parts are permanently connected with each other and with the jib proper, there is no possibility of the parts becoming lost in transit or misassociated in any way. Set-up time and dismantling of the luffing jib is also rendered less time-consuming.

A further object is to provide in a luffing jib structure for crane booms an assemblage of pivotally connected masts and cooperative folding ladders forming a part of the pendant line between the point of the boom and the bridle assembly which possesses an automatic operating mode when the jib is swung from a near vertical to a near horizontal position, in terms of transferring the pendant line tension load to the third mast and preventing the taut pendant line above the bridle from moving too close to the rear of the crane boom.

A further object is to provide in a luffing jib for crane booms a system of three cooperating masts which are permanently pivotally connected to the base of the jib. The third mast of the system is controlled by a foldable tension link which interconnects the second and third masts and when fully extended during lowering of the jib toward a horizontal attitude lifts and rotates the third mast so that the latter will engage a gooseneck portion of a lower ladder connected in the pendant line and moving toward the nose of the boom. The engagement of the third mast with the gooseneck portion terminates the movement of the lower ladder toward the nose of the crane boom and precludes any fouling of the pendant line as the luffing jib approaches a horizontal position.

Still another important object of the invention is to provide a crane boom luffing jib which can be operated freely through a positive angle of 72 degrees above horizontal.

A further and more general objective is to provide a luffing jib structure which is simple, reliable in operation, strong and entirely practical.

In accordance with the present invention, there is also provided a means for storing the bridle assembly in the pendant line on one side of the crane boom and for conveniently moving the bridle assembly to a position at the top of the boom through a combined swinging and linear movement so that the bridle assembly will be in a proper position for release and use in conjunction with the luffing jib.

Other objects and advantages of the invention will become apparent during the course of the following description.

DETAILED DESCRIPTION

Figures 1, 2:
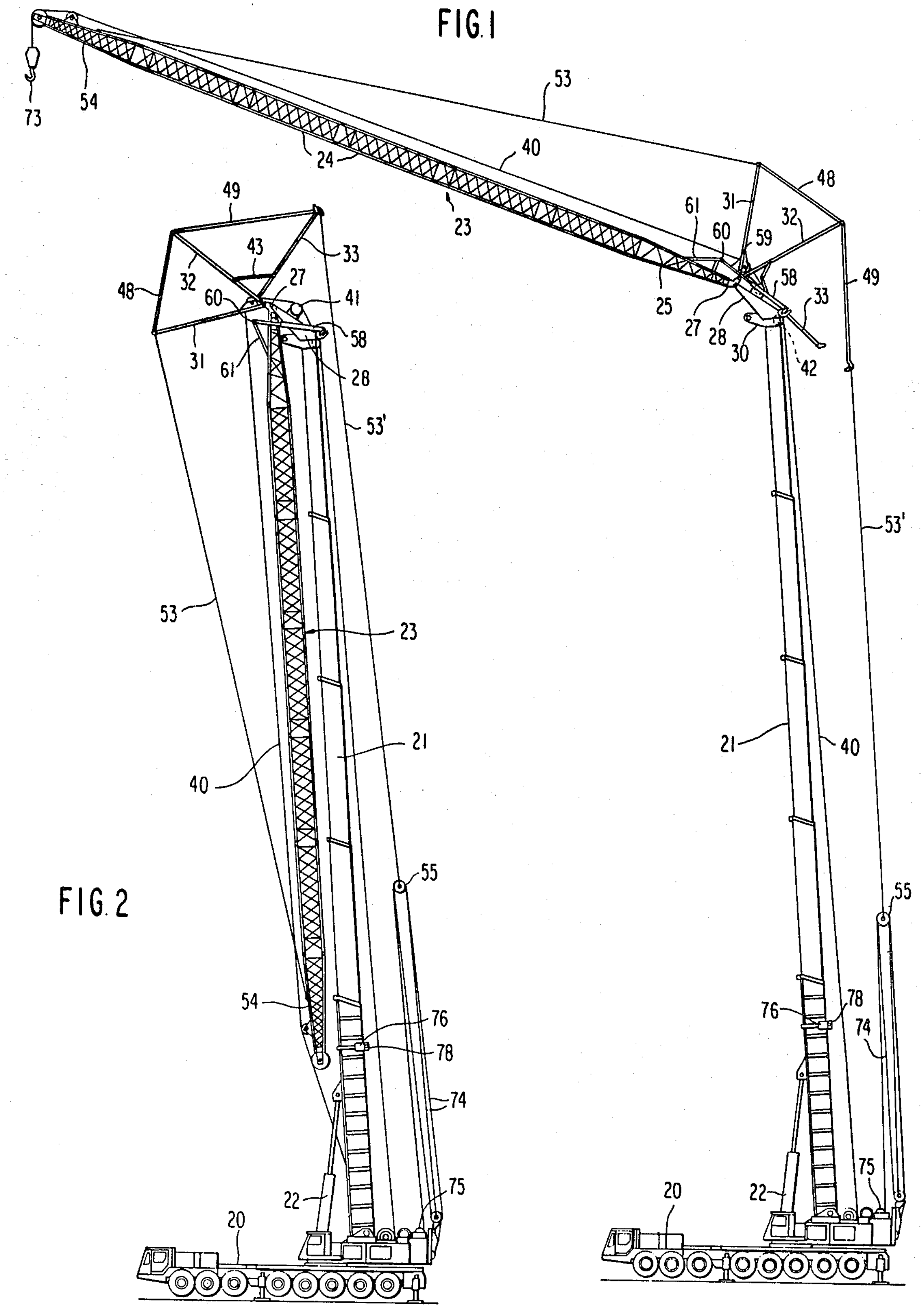
FIG. 1 is a side elevation of a luffing jib for a crane in accordance with the invention and with the jib shown in a use position.
FIG. 2 is a similar side elevation showing the luffing jib stowed close to and along the crane boom.

Referring to the drawings in detail wherein like numerals designate like parts and referring first to FIGS. 1 and 2, a mobile crane is shown including a carrier 20 and a multi-section hydraulically operated boom 21 mounted for sluing with a supporting turntable on the carrier and for luffing under control of luffing cylinders 22. The crane boom 21 is of a type in which a selected boom section or sections can be fully extended and mechanically locked during use. The boom sections are not utilized in partially extended positions, and when fully extended and locked, are not dependent upon hydraulic pressure to prevent collapse or retraction of the boom. As shown in FIGS. 1 and 2, a five section crane boom has all of its sections fully extended and mechanically locked and the boom is elevated to an angle of 84 degrees above horizontal. It is utilized only in this elevated position with the luffing jib 23 forming the subject matter of the present invention, it being understood that the invention is not limited in terms of boom size, number of boom sections, angle of boom elevation, and the type of crane with which the invention is utilized, these factors being variable.

The luffing jib 23 is preferably formed in readily separable twenty foot sections 24 for convenient truck transport along with other crane accessories. When assembled as shown in the drawings, the luffing jib can measure up to nearly 140 feet in length.

The jib base section 25 has its rear end terminal 26 pivotally attached by a coupling 27 with a rigid adapter 28 atop the crane boom 21, the adapter being coupled by coupling means 29 to the nose piece 30 of the boom. The adapter 28 projects sufficiently beyond the forward side of the boom 21 to enable downward swinging of the jib 23 to a stored position close and substantially parallel to the boom 21, as shown in FIG. 2.

In accordance with an important aspect of the invention, first, second and third masts 31, 32 and 33 are pivotally connected with and bodily carried by the jib base section 25. More particularly, the first mast 31 is directly pivoted at 34 to the terminal piece 26 of the jib. The second mast 32 is pivotally attached at 35 to an inner terminal 36 of the first mast 31. The third mast 33 is similarly pivotally connected at 37 to an inner terminal 38 of the second mast 32.

Figure 3:
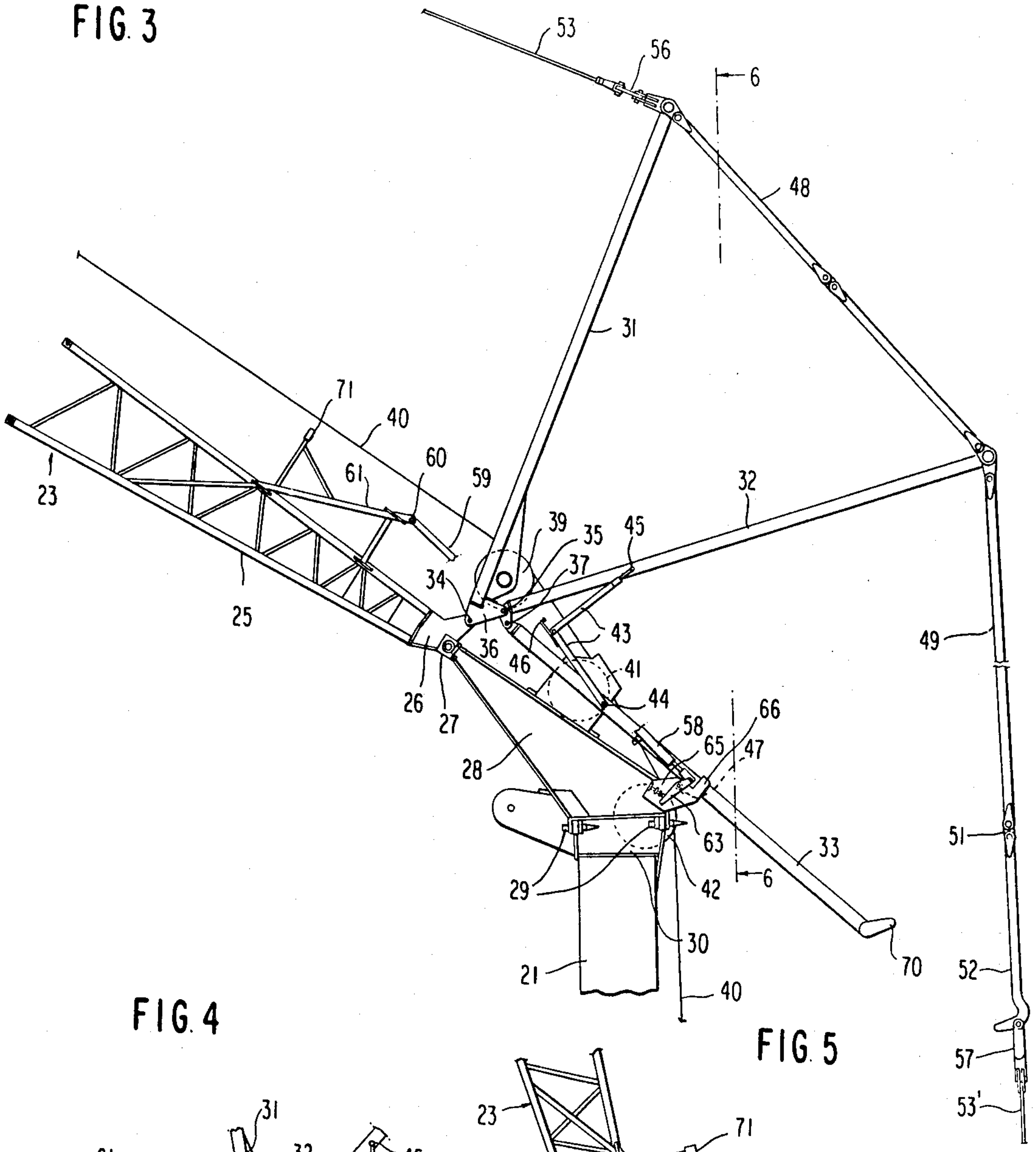
FIG. 3 is an enlarged fragmentary side elevation, with parts omitted, showing the jib base section, an adapter to which the jib is pivoted, and associated masts and components.
Figure 4:
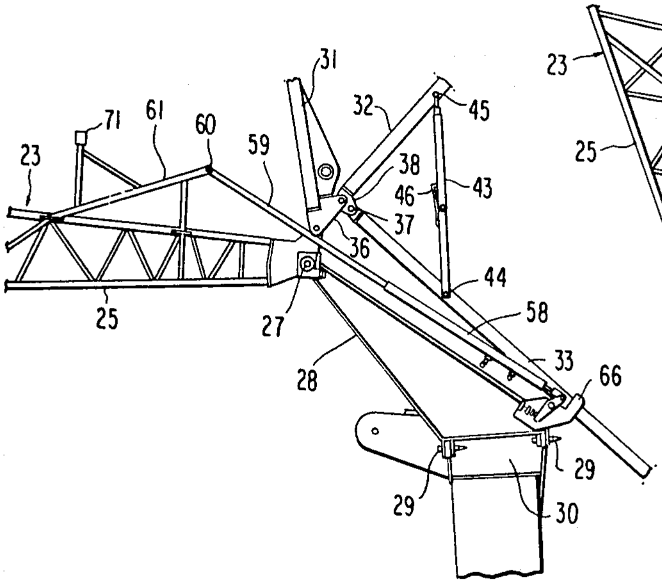
FIG. 4 is a fragmentary elevational view similar to FIG. 3 showing the jib in a horizontal position.
Figure 5:
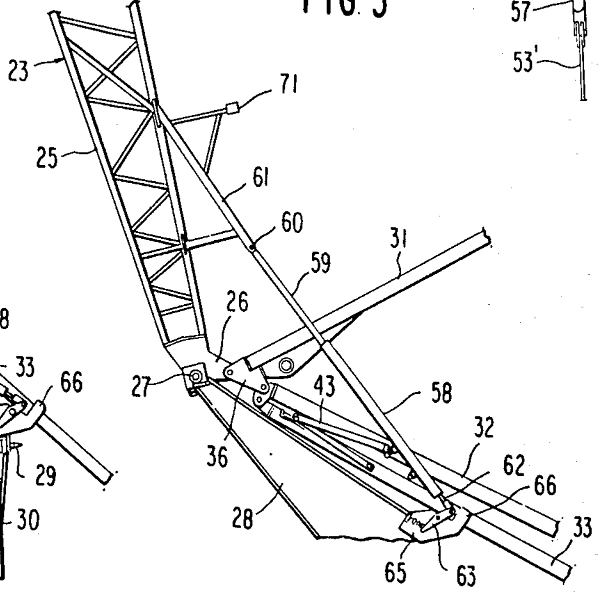
FIG. 5 is a similar view showing the jib in a fully raised position.
Figure 6:
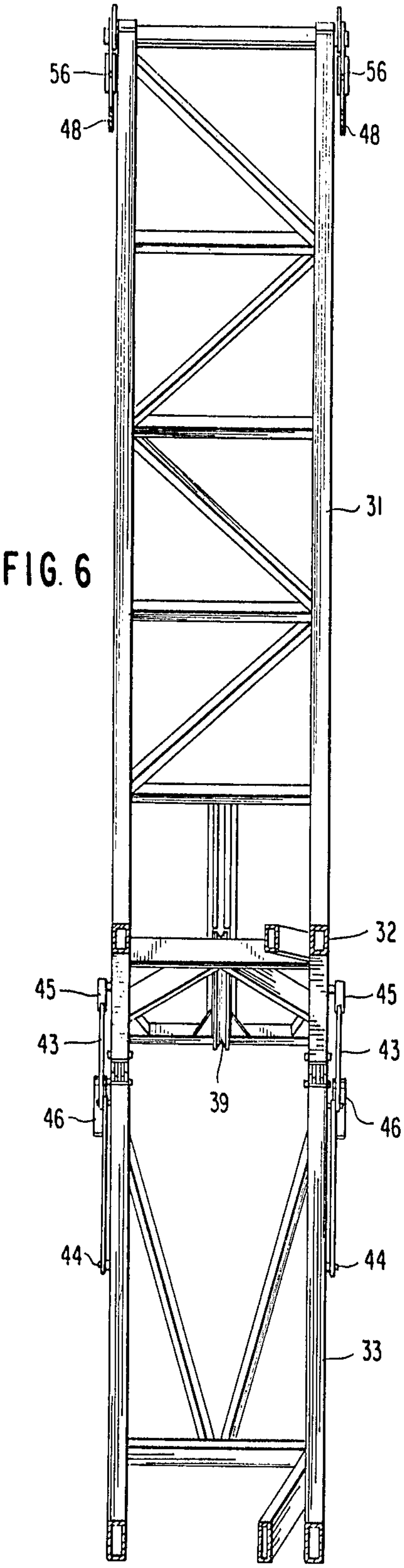
FIG. 6 is a fragmentary vertical section taken on line 6—6 of FIG. 3 with background parts omitted.

The first mast 31 near its inner end carries a guidance sheave 39 for the load cable 40 of the luffing jib, which cable engages further guide sheaves 41 and 42 on the adapter 28 and nose piece 30, respectively, FIG. 5. The second and third masts 32 and 33 are interconnected by one-way collapsing tension links 43 whose opposite ends are pivotally attached at 44 and 45, FIG. 6, to the respective masts 32 and 33. The tension links 43 are able to fold or collapse only in the direction shown in FIG. 3 or toward the inner pivoted ends of the masts 32 and 33. A stop element 46 carried by each tension link prevents collapse of the link in the outward direction. When the tension links are extended and straight, FIG. 4, they can begin lifting the third mast 33 from a provided rest 47 for the third mast on the adapter 28. When so lifted, the third mast will follow the jib 23 on the first and second masts 31 and 32 in rotation around the axis of the pivot means 27 in the counterclockwise direction, as viewed in FIGS. 1 and 2.

Further important elements of the invention consist in the use of upper and lower ladders 48 and 49 which are crossbraced as at 50 to reduce torsional forces on the jib 23 and boom 21. The upper ladder 48 has its ends coupled between the outer ends of first and second masts 31 and 32 and is constructed in two equal length sections adapted to break or collapse inwardly toward the pivot 27 when the plural mast and ladder structure is folded on the jib base section 25 for transport, FIG. 9.

Figure 9:
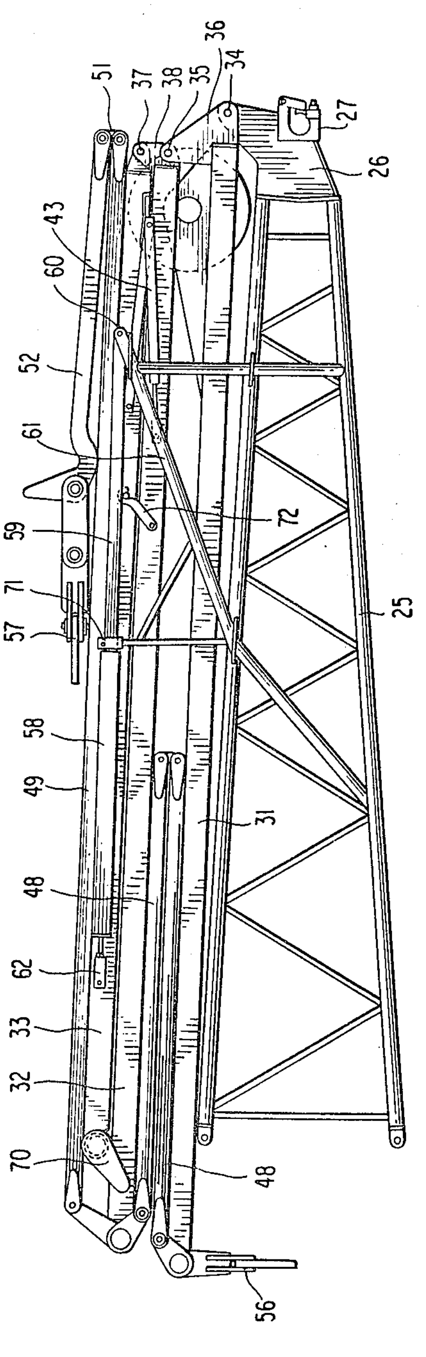
FIG. 9 is a side elevation of the components of FIG. 8.

The lower ladder 49 has a hinge joint 51 near and to one side of its longitudinal center to enable a gooseneck extension 52 thereof to be folded back onto the body portion of the lower ladder 49, as shown in FIG. 9.

When in their fully extended states, the upper and lower ladders 48 and 49 are connected in and form a part of the conventional cable pendant line 53—53′ connected between the jib point section 54 and a bridle assembly 55, to be further described, held during use well above the base of the crane, as shown in FIG. 1. The pendant line 53—53′ may consist of four separate cables and conventional connectors 56 and 57 for these pendant line cables are used to connect them with the two ladders 48 and 49, as illustrated.

Figure 6A:
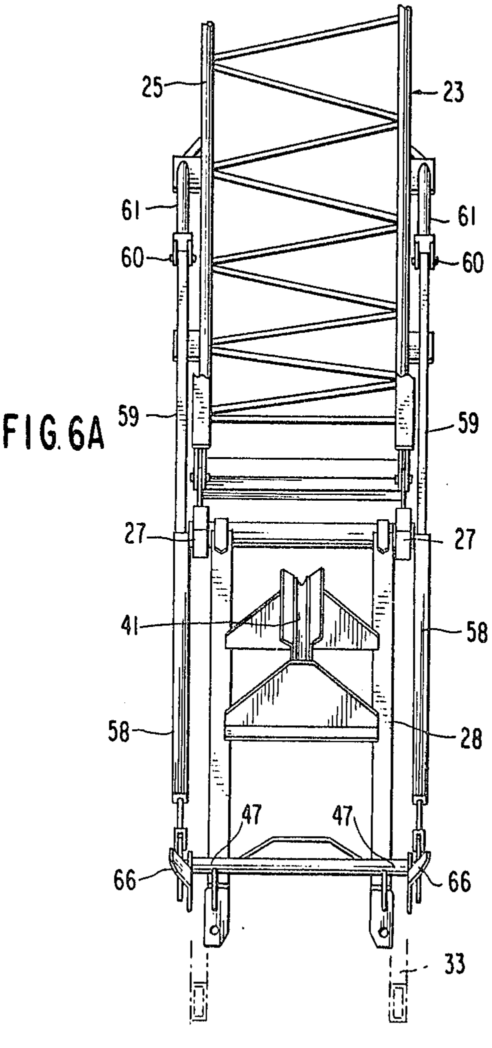
FIG. 6A is a similar view taken on line 6—6 of FIG. 5 showing the background parts omitted in FIG. 6.
Figure 8:
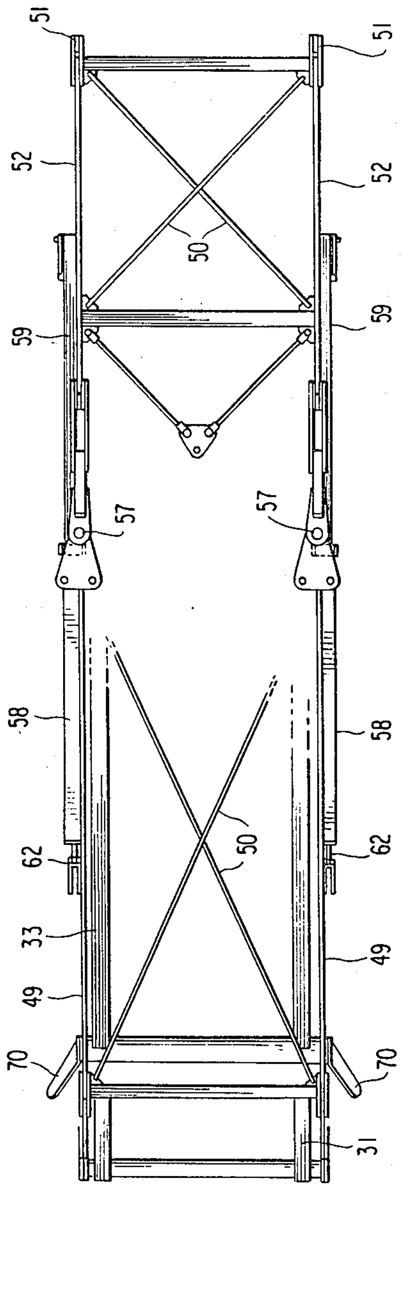
FIG. 8 is a plan view of folded masts and ladders in stacked relationship upon the luffing jib base section, parts omitted.

The structure further comprises a pair of safety telescoping backstays 58 on opposite sides of the luffing jib 23 whose telescoping rods 59 are pivotally connected at 60 with elevated supports 61 rigid with the jib base section 25. The purpose of the backstays 58 is to prevent the possibility of backward tipping over of the luffing jib 23, as where the latter abruptly loses its load in a steeply elevated position. The backstays 58 will form solid links with the support elements 61 to positively limit upward swinging movement of the jib 23 to an angle of about 72 degrees above the horizontal, this limited position being shown in FIG. 5 of the drawings. In such limiting position, an adjustable extension rod 62, FIG. 7, at the base of each backstay cylinder will operate a control lever 63 pivotally attached at 64 to a bracket extension 65 of the adapter 28. The bracket extension 65 carries upwardly projecting divergent plates 66 which assist the nesting or cradling of the third mast 33 on the rest 47 of the adapter 28, FIGS. 3 and 6A.

Figure 7:
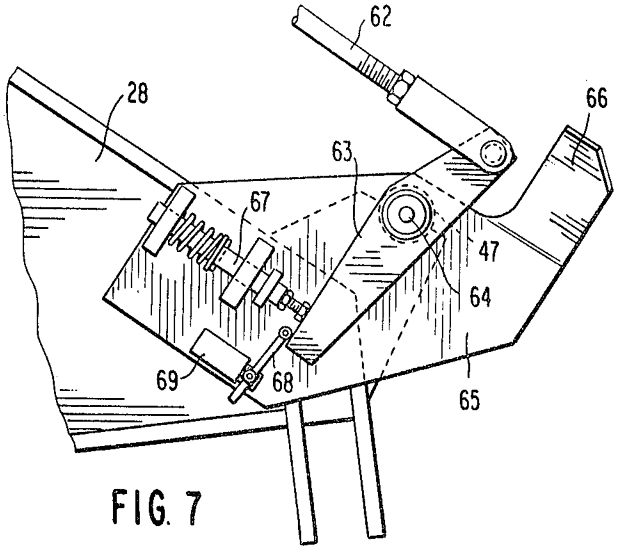
FIG. 7 is an enlarged fragmentary side elevation showing a control switch operating lever connected with and operated by a safety backstay means of the luffing jib.

When the aforementioned control lever 63 is rotated on its pivot 64 due to bottoming of the backstay 58, its rotation is opposed by an adjustable heavy spring buffer 67 or plunger, FIG. 7, but sufficient movement of the lever 63 will occur to displace the actuator 68 of a control switch 69, which in turn will operate further conventional safety controls whereby the crane operator cannot elevate the jib 23 beyond the position shown in FIG. 5 which is 72 degrees above horizontal. FIG. 4 shows the jib in its full down horizontal position. The jib thus has a luffing range of 72 degrees in the present invention, which is significantly greater than known prior art arrangements.

When the jib 23 is descending and turning counterclockwise on its pivot 27, the pendant line 53′ and lower ladder 49 are gradually approaching the back of the boom 21. At a point safely ahead of possible fouling of the pendant line by contact with the nose of the boom, the gooseneck portion 52 of the lower ladder 49 enters between a pair of divergent extension plates 70 carried by the outer end of the third mast 33. These divergent plates guide the gooseneck into engagement with the third mast 33 and the latter prevents further movement of the pendant line 53′ and lower ladder 49 toward the back of the crane boom. Substantially simultaneously, the tension link 43 becomes fully extended and begins to lift the third mast which will then travel with the luffing jib 23 and with the leading two masts 31 and 32. From this point on, as the jib travels toward its stored position of FIG. 2, the three masts and two ladders 48 and 49 rotate with the jib around the jib pivot 27 as a rigid truss-like unit so as to hold the pendent cables 53 and 53′ properly spaced from the backs of the jib and crane boom. As stated previously, an important feature of the structure is having the two ladders 48 and 49 connected in the pendant line defined by the cables 53 and 53', and effecting automatically the engagement of the gooseneck portion 52 with the third mast 33, as well as the lifting up of the third mast automatically by the extended tensions links 43. It is also important in the invention that the two ladders 48 and 49 be foldable to effect the very compact transport configuration shown in FIG. 9 where the first mast 31 rests upon the separated jib base section 25, the folded upper ladder 48 rests upon the first mast, the folded second mast 32 rests on the folded upper ladder, the third mast 33 rests upon the second mast, and the folded lower ladder 49 rests upon the third mast 33.

Additionally, with respect to the folded construction in FIG. 9, the two backstays 58 are swung completely over on the pivots 60 to overlie the jib base section 25. A pair of cradles 71 for the support of the backstays in the rotated positions are provided on the jib base section and are structurally tied into the supports 61 to form rigid units. In addition to the folded structure in FIG. 9 being highly compact for convenient storage and transport, it has the added advantage of maintaining the luffing jib base section permanently assembled with the three masts, two ladders and the safety backstays 58 whereby these components can never be separated, lost or misarranged. Small hooks 72, FIG. 9, pivotally carried by the second mast 32 serve to hold the parts in folded relationship as shown in FIG. 9.

Another benefit gained from the invention is the prevention of gradual downdrift of the telescopic boom 21 from the position shown in FIG. 2 while the crane is unattended even in the case of leakage or failure of hydraulic pressure in the boom luffing cylinders. This benefit is derived as follows. The load cable hook 73 hidden in FIG. 2 is attached to a stationary part of the crane near the base of the boom so that the load cable 40 prevents the stored jib from swinging away from the boom 21 with which it is parallel. All slack is taken up in the pendant line including the compounding runs 74 between the bridle 55 and the winch 75 which operates the pendant line. This winch is mechanically locked. With these conditions prevailing, the two cable systems will hold the crane boom 21 elevated without hydraulic pressure, if need be.

Figure 10:
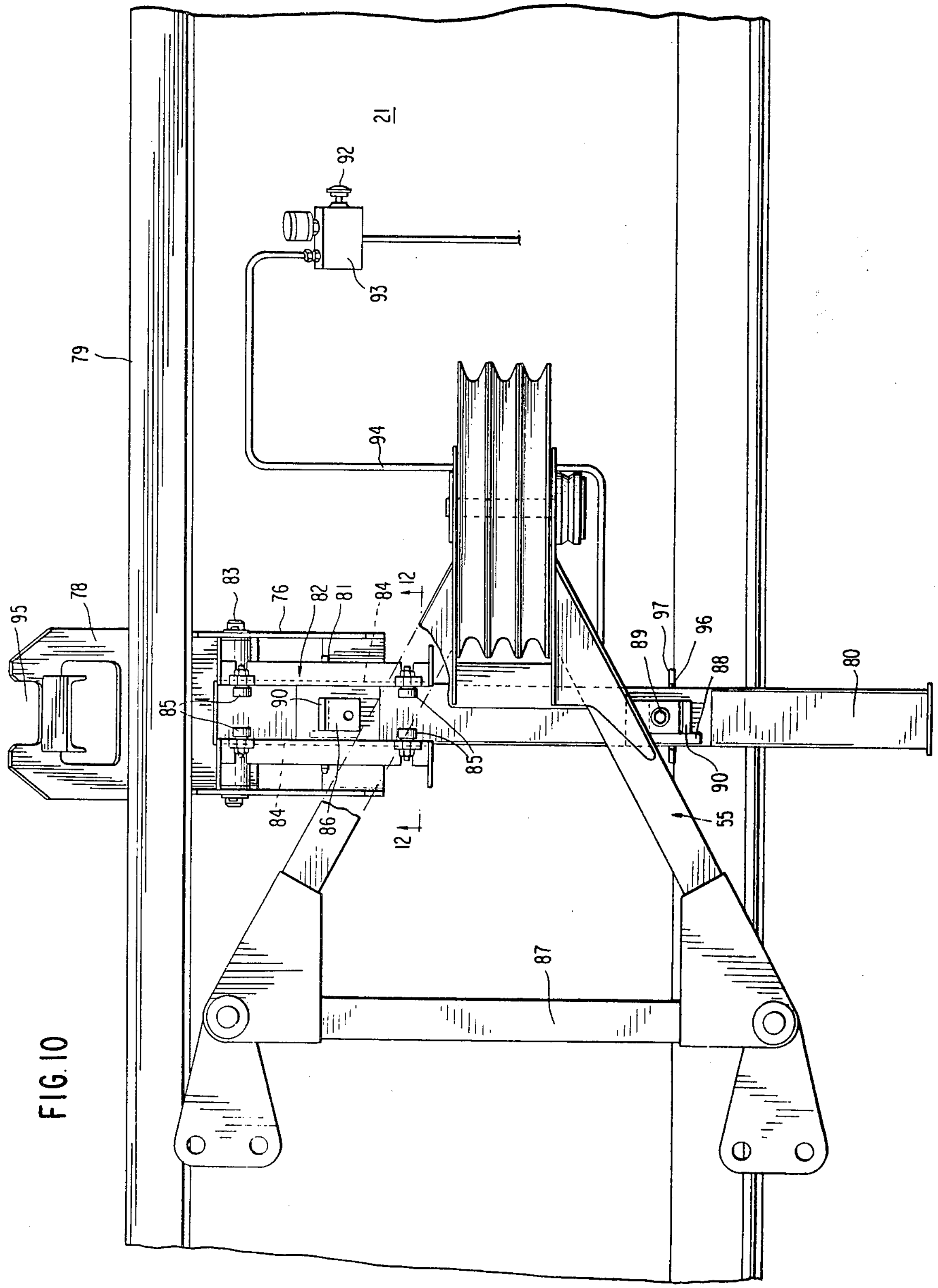
FIG. 10 is a fragmentary side elevation of the crane boom and a bridle assembly stored thereon taken on line 10—10 of FIG. 11.
Figure 11:
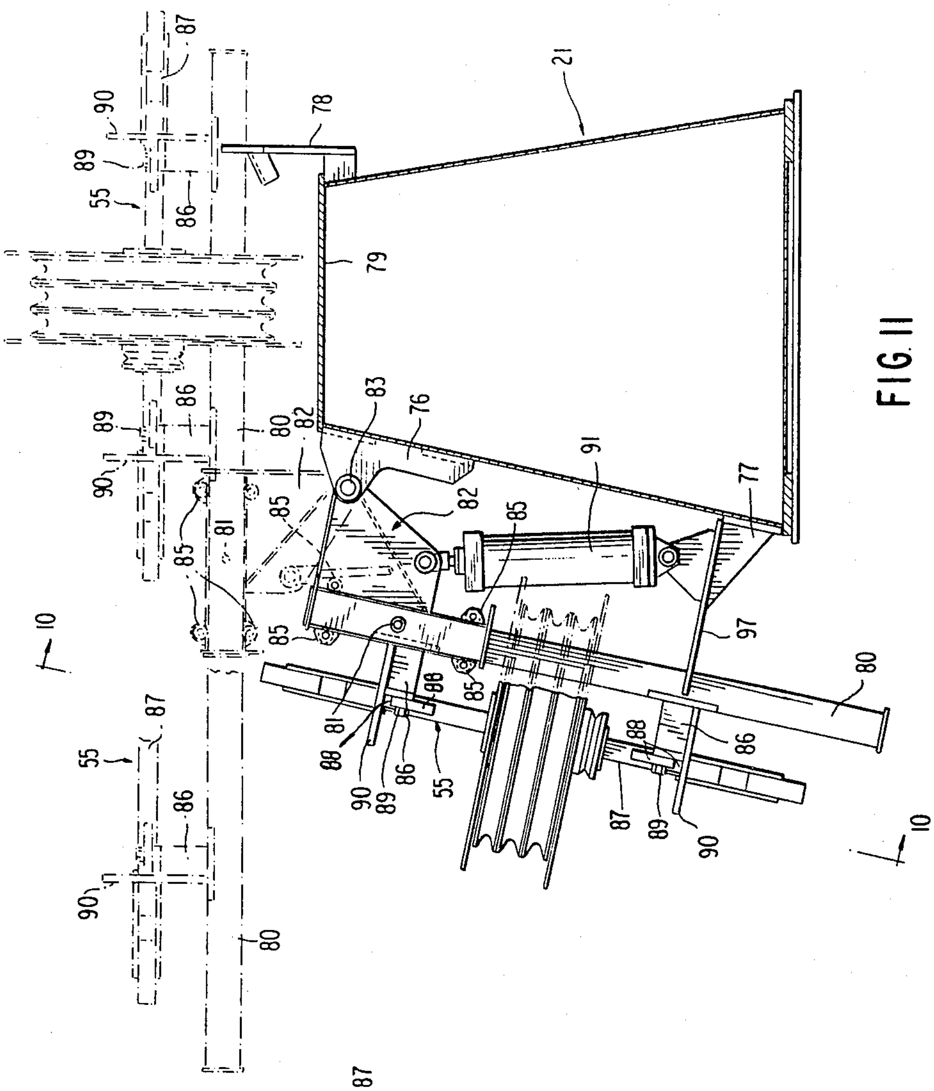
FIG. 11 is a cross sectional view taken through the crane boom with the bridle assembly stored thereon, the bridle assembly being shown in an intermediate position in phantom lines.
Figure 12:
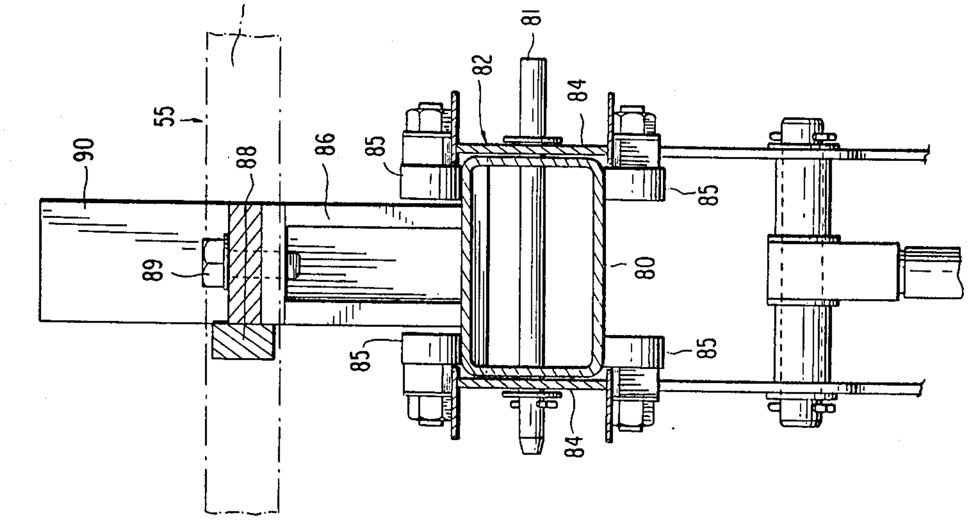
FIG. 12 is an enlarged substantially horizontal section taken on line 12—12 of FIG. 10.

In accordance with a further feature of the invention shown in drawing FIGS. 10–12, a means is provided for storing bridle assembly 55 on one side of the base section of boom 21 and for moving the bridle assembly at proper times to and from the upper side of the boom where it can be released for normal operation in the pendant line or easily retrieved for locking and storage on the boom.

This means comprises fixed upper and lower brackets 76 and 77 on one side wall of the boom base section and a third supporting bracket 78 on the opposite side wall of the boom projecting above the top wall 79 thereof. A straight rigid carriage tube 80 on which the bridle assembly 55 is releasably locked is secured by a removable pin 81 to a roller guide structure 82 pivotally held on the bracket means 76 by a pivot element 83. The roller guide structure includes a pair of side plates 84 which straddle the opposite sides of carriage tube 80 and carry pairs of guide rollers 85 guidingly engaging the top and bottom walls of carriage tube 80.

Posts 86 rigid with the carriage tube 80 rise from one side thereof and support the triangular frame 87 of bridle assembly 55 in spaced parallel relationship to the carriage tube. Apertured plates 88 on the converging sides of frame 87 receive screws 89 which anchor the bridle assembly releasably to the two posts 86. Locator plates 90 projecting from the posts 86 serve to center the triangular frame 87 relative to the posts 86.

A one-way active power cylinder 91 retracted by gravity force is coupled between the bracket 77 and pivoted roller guide unit or structure 82 to swing the latter from the bridle storage position shown in full lines to the bridle releasing and retrieval position shown in phantom lines in FIG. 11. While in the stored position, the carriage tube 80 is locked to the unit 82 by the pin 81 and the bridle assembly 55 is locked by screws 89 to the posts 86 of the carriage tube.

When an operator depresses a control button 92 of a control valve 93, FIG. 10, connected by a fluid line 94 to one-way cylinder 91, the carriage tube 80 and locked bridle assembly 55 are swung as a unit with the guide roller structure 82 to an intermediate position, FIG. 11, where the axis of the carriage tube is across the wall 79 of the boom but the carriage tube and bridle assembly are still disposed outwardly from one side wall of the boom. At this time, the pin 81 is pulled and the carriage tube 80 is released from the guide roller structure 82 and can be manually moved to the right in FIG. 11 across the top wall 79 of boom 21 until the bridle assembly is centered with respect to such wall. At this time, the end portion of carriage tube 80 away from the structure 82 is supported within a rest recess 95 of bracket 78. A similar rest recess is provided at 96, FIG. 10, on a plate portion 97 of the bracket 77, FIG. 11.

Upon reaching the position above the boom wall 79 in FIG. 11, the two screws 89 are removed and this frees the bridle assembly 55 to rise to its use position shown in FIGS. 1 and 2 due to tension in the pendant line. Similarly, when the pendant line is sufficiently slackened, the bridle assembly can be manually guided back to its cradled position on the two posts 86 of carriage tube 80 and anchored in place by the screws 89, following which the carriage tube 80 can be moved through the guide rollers 85 to the intermediate position and locked by replacement of the pin 81, preparatory to swinging the carriage tube, structure 82 and the bridle assembly 55 back to the stored position shown in full lines in FIG. 11.

In summation, it can now be seen that the invention provides a luffing jib of improved range and capacity which is easy to erect and includes backstay means for safety. Additionally, the jib can be safely stored close to the crane boom as where the crane is parked unattended at a building site. In such condition, means are provided to insure against drift down of the extended telescopic boom.

Further, according to the invention, three masts for the support of the pendant line are pivoted to the base section of the jib and the second and third masts are connected by a one-way folding tension link means. The outer extremities of the masts are connected by hard links of ladder construction which are foldable and are located in the pendant line. The lower ladder includes a gooseneck which moves automatically into engagement with the third or trailing mast to arrest movement of the pendant line toward the back of the crane boom during swinging of the luffing jib to its stored position. Also, during this movement, the extended tension links between the second and third masts lift and pull the third mast along with the jib and first and second masts.

Another feature is the means of storing the bridle assembly on one side of the crane boom and for shifting the assembly to a ready release position at the rear of the boom.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. In a crane, a main boom having a top wall with an adjacent side wall, bracket means carried by one side of said boom, a bridle carriage means pivotally connected to the bracket means by a pivot means defining a pivot axis parallel with the longitudinal axis of said boom and having a lockable and releasable linear movement carriage element, means to releasably lock a bridle assembly to said carriage element, power means to arcuately swing the bridle carriage means from a position adjacent one side of the boom to a position substantially parallel with the adjacent top wall of the boom wherein the carriage element has its axis disposed across the top wall of said boom, whereby the carriage element upon release is shiftable on a linear path with the bridle assembly to a bridle assembly deployment and retrieval position adjacent to the top wall of the boom.

2. In a crane, a main boom having a top wall with an adjacent side wall, bracket means carried by one side of said boom, a bridle carriage means pivotally connected to the bracket means and having a lockable and releasable linear movement carriage element, means to releasably lock a bridle assembly to said carriage element, power means to swing the bridle carriage means to a position where the carriage element has its axis disposed across the top wall of said boom, whereby the carriage element upon release is shiftable on a linear path with the bridle assembly to a bridle assembly deployment and retrieval position adjacent to the top wall of the boom, and a stabilizing support element carried by said boom for a cantilevered end portion of the carriage element in the last-named position of the carriage element on said boom.

3. In a crane, a main boom having a top wall with an adjacent side wall, bracket means carried by one side of said boom, a bridle carriage means pivotally connected to the bracket means and having a lockable and releasable linear movement carriage element, means to releasably lock a bridle assembly to said carriage element, a stabilizing support element carried by said one side of said boom for a cantilevered end portion of the carriage element when the latter is stored at the one side of the boom, power means to swing the bridle carriage means to a position wherein the carriage element has its axis disposed across the top wall of said boom, whereby the carriage element upon release is shiftable on a linear path with the bridle assembly to a bridle assembly deployment and retrieval position adjacent to the top wall of the boom.

4. In a crane as defined in claim 3, and said power means comprising a cylinder unit coupled between the stabilizing support element and bridle carriage means.

5. In a crane, a main boom having a top wall with an adjacent side wall, bracket means carried by one side of said boom, a bridle carriage means pivotally connected to the bracket means and having a lockable and releasable linear movement carriage element, a pair of spaced posts on said carriage element and projecting beyond one side thereof, fastener means coacting with said posts to releasably lock the triangular frame of a bridle assembly to said carriage element, power means to swing the bridle carriage means to a position wherein the carriage element has its axis disposed across the top wall of said boom, whereby the carriage element upon release is shiftable on a linear path with the triangular frame bridle assembly to a bridle assembly deployment and retrieval position adjacent to the top wall of the boom.

6. In a crane as defined in claim 5, and said carriage element comprising a straight bar-like element, the bridle carriage means including a roller guide unit for the bar-like element pivoted to the bracket means.

7. In a crane as defined in claim 5, in which said fastener means are threaded fastener means, locator means on said posts for the opposite sides of the triangular frame bridle assembly, and said posts, threaded fastener means and locator means positioned on opposite sides of the triangular frame bridle assembly.

8. In a crane, a main boom having a top wall with an adjacent side wall, bracket means carried by one side of said boom, a bridle carriage means pivotally connected to the bracket means, said bridle carriage means having a lockable and releasable linear movement carriage element and having a roller guide unit for the carriage element pivotally connected to the bracket means, means to releasably lock a bridle assembly to said carriage element, power means to swing the bridle carriage means to a position wherein the carriage element has its axis disposed across the top wall of said boom, whereby the carriage element upon release is shiftable on a linear path with the bridle assembly to a bridle assembly deployment and retrieval position adjacent to the top wall of the boom.

9. In a crane as defined in claim 8, and the carriage element comprising a substantially rectangular cross section elongated bar-like element, and said roller guide unit including spaced pairs of guide rollers engaging opposite walls of the bar-like element.

* * * * *